(12) United States Patent
Kolhouse et al.

(10) Patent No.: US 10,570,841 B2
(45) Date of Patent: Feb. 25, 2020

(54) REGENERATION OF GASOLINE PARTICULATE FILTERS

(71) Applicant: CUMMINS INC., Columbus, IN (US)

(72) Inventors: J. Steven Kolhouse, Columbus, IN (US); Samuel C. Geckler, Columbus, IN (US); David J. Stroh, Columbus, IN (US); Ying Yuan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 33 days.

(21) Appl. No.: 16/047,397

(22) Filed: Jul. 27, 2018

(65) Prior Publication Data

US 2019/0040809 A1 Feb. 7, 2019

Related U.S. Application Data

(60) Provisional application No. 62/540,834, filed on Aug. 3, 2017.

(51) Int. Cl.

| F02D 41/02 | (2006.01) |
|---|---|
| F02D 41/00 | (2006.01) |
| F01N 3/021 | (2006.01) |
| F01N 9/00 | (2006.01) |
| F02P 5/04 | (2006.01) |
| F02M 26/43 | (2016.01) |

(52) U.S. Cl.
CPC .......... *F02D 41/029* (2013.01); *F01N 3/021* (2013.01); *F01N 9/002* (2013.01); *F02D 41/0055* (2013.01); *F02D 41/0065* (2013.01); *F02D 41/0082* (2013.01); *F02M 26/43* (2016.02); *F02P 5/04* (2013.01); *F01N 2430/08* (2013.01); *F01N 2900/1406* (2013.01); *F01N 2900/1606* (2013.01); *F02D 2200/0812* (2013.01)

(58) Field of Classification Search
CPC .. F02D 37/02; F02D 41/0055; F02D 41/0065; F02D 41/008; F02D 41/0082; F02D 41/029; F02D 2200/0812; F01N 3/021; F01N 9/002; F01N 2430/08; F01N 2560/08; F01N 2900/1406; F01N 2900/1606; F02M 26/05; F02M 26/43; F02P 5/04; F02P 5/045
See application file for complete search history.

(56) References Cited

U.S. PATENT DOCUMENTS

| 8,136,505 B2 | 3/2012 | Ruhland et al. |
| 8,341,947 B2 | 1/2013 | Hepburn et al. |
| 8,402,943 B2 | 3/2013 | Ruhland et al. |
| 8,464,514 B2 | 6/2013 | Kerns et al. |

(Continued)

*Primary Examiner* — Audrey K Bradley
(74) *Attorney, Agent, or Firm* — Foley & Lardner LLP

(57) ABSTRACT

A internal combustion engine system includes a gasoline internal combustion engine having a set of donor cylinders and a set of non-donor cylinders. The donor cylinders provide a proportion of the exhaust gas to an exhaust gas recirculation system and the remainder of the exhaust gas to an exhaust gas aftertreatment system including a particulate filter. The non-donor cylinders also provide exhaust gas to exhaust gas aftertreatment system. An engine controller can determine whether the particulate filter needs regeneration, and in response, retard a spark timing of the non-donor cylinders by an amount that is different from an amount or retardation of the donor cylinders.

23 Claims, 2 Drawing Sheets

(56) References Cited

U.S. PATENT DOCUMENTS

| | | | |
|---|---|---|---|
| 2013/0186376 A1* | 7/2013 | Peters | F02D 41/0065 |
| | | | 123/568.2 |
| 2015/0354477 A1* | 12/2015 | Leone | F02D 37/02 |
| | | | 123/406.26 |
| 2016/0097367 A1* | 4/2016 | Geckler | F02D 41/0085 |
| | | | 123/406.44 |
| 2017/0363057 A1* | 12/2017 | Gukelberger | F02D 41/0065 |
| | | | 123/568.2 |

* cited by examiner

REGENERATION OF GASOLINE PARTICULATE FILTERS

CROSS-REFERENCE TO RELATED APPLICATIONS

The present application claims priority to U.S. Provisional Patent Application No. 62/540,834, filed Aug. 3, 2017, entitled "Regeneration of Gasoline Particulate Filters" and the contents of which are incorporated herein by reference.

TECHNICAL FIELD

The present disclosure relates to internal combustion engine systems.

BACKGROUND

Systems using gasoline internal combustion engines often include an exhaust aftertreatment system operatively connected to the internal combustion engine. The exhaust aftertreatment system can include a particulate filter for filtering soot or particulate matter from an exhaust gas generated by the engines. The exhaust aftertreatment system may also include catalytic converters that process potentially harmful compounds in the exhaust gas.

SUMMARY

In one aspect, a method for regeneration of a particulate filter downstream of an internal combustion engine having a plurality of cylinders comprises operating at least one donor cylinder and at least one non-donor cylinder of the internal combustion engine at a spark timing. The particulate filter receives exhaust gas from the at least one non-donor cylinder and the at least one donor cylinder. A proportion of exhaust gas generated by the at least one donor cylinder is provided to an exhaust gas recirculation system. The method further comprises determining a need for regeneration of the particulate filter based on at least a first input. The method also comprises, responsive to determining the need for regeneration, retarding the spark timing of the at least one non-donor cylinder by a first amount of retardation and retarding the spark timing of the at least one donor cylinder by a second amount of retardation, where the first amount is unequal to the second amount.

In one or more implementations, retarding the spark timing of the at least one non-donor cylinder by a first amount of retardation and retarding the spark timing of the at least one donor cylinder by a second amount of retardation comprises setting the first amount of retardation to be greater than the second amount of retardation. In one or more implementations, retarding the spark timing of the at least one non-donor cylinder by a first amount of retardation and retarding the spark timing of the at least one donor cylinder by a second amount of retardation comprises setting the second amount of retardation to zero. In one or more implementations, the method further comprises determining a completion of regeneration of the particulate filter based on at least a second input, and responsive to determining the completion of the regeneration, advancing the spark timing of the at least one non-donor cylinder by the first amount or retardation and advancing the spark timing of the at least one donor cylinder by the second amount of retardation.

In another aspect, a method for regeneration of a particulate filter downstream of an internal combustion engine having a plurality of cylinders comprises operating at least one donor cylinder and at least one non-donor cylinder of the internal combustion engine at a spark timing, where the particulate filter receives exhaust gas from only the non-donor cylinders. The method further comprises determining a need for regeneration of the particulate filter based on at least a first input. The method also comprises, responsive to determining the need for regeneration, retarding the spark timing of the at least one non-donor cylinder by a first amount of retardation and retarding the spark timing of the at least one donor cylinder by a second amount of retardation, where the first amount is unequal to the second amount.

In one or more implementations, operating the at least one donor cylinder and the at least one non-donor cylinder of the internal combustion engine at the spark timing comprises providing an exhaust gas form the at least one donor cylinder to an exhaust gas recirculation system. In one or more implementations, determining the need for regeneration of the particulate filter based on the at least a first input comprises determining whether a pressure differential across the particulate filter being is than a threshold value. Retarding the spark timing of the at least one non-donor cylinder by a first amount of retardation and retarding the spark timing of the at least one donor cylinder by a second amount of retardation may comprise setting the first amount of retardation to be greater than the second amount of retardation. Retarding the spark timing of the at least one non-donor cylinder by a first amount of retardation and retarding the spark timing of the at least one donor cylinder by a second amount of retardation may comprise setting the second amount of retardation to zero. Determining the need for regeneration of the particulate filter based on the at least a first input may comprise determining whether a pressure differential across the particulate filter is greater than a threshold pressure value.

In another aspect, an engine system is provided. An internal combustion engine comprises at least one donor cylinder and at least one non-donor cylinder. An exhaust gas recirculation system is in exhaust gas receiving communication with the at least one donor cylinder and in exhaust gas providing communication with an intake manifold of the internal combustion engine. An exhaust aftertreatment system is in exhaust gas receiving communication with the internal combustion engine. The exhaust aftertreatment system comprises a particulate filter. An engine controller is configured to operate the at least one donor cylinder and the at least one non-donor cylinder of the internal combustion engine at a spark timing; determine a need for regeneration of the particulate filter based on at least a first input; and, responsive to determining the need for regeneration, retard the spark timing of the at least one non-donor cylinder by a first amount of retardation and retarding the spark timing of the at least one donor cylinder by a second amount of retardation, the first amount being unequal to the second amount.

In one or more implementations, the exhaust aftertreatment system is in exhaust gas receiving communication with only the at least one non-donor cylinder. A proportion of exhaust gas generated by the at least one donor cylinder may be provided to the exhaust gas recirculation system, and an exhaust gas recirculation valve may be positioned and configured so as to selectively change the proportion of the exhaust gas generated by the at least one donor cylinder that is provided to the exhaust gas recirculation system. The engine controller may be further configured to, further responsive to determining the need for regeneration, adjust the exhaust gas recirculation valve, thereby changing the proportion of the exhaust gas generated by the at least one donor cylinder that is provided to the exhaust gas recirculation system. The engine system of claim 14, wherein retarding the spark timing of the at least one non-donor cylinder by a first amount of retardation and retarding the spark timing of the at least one donor cylinder by a second amount of retardation comprises setting the first amount of retardation to be greater than the second amount of retardation. Retarding the spark timing of the at least one non-donor cylinder by a first amount of retardation and retarding the spark timing of the at least one donor cylinder by a second amount of retardation may comprise setting the second amount of retardation to zero. Determining the need for regeneration of the particulate filter based on the at least a first input may comprise determining whether a pressure differential across the particulate filter is greater than a threshold pressure value. Determining the need for regeneration of the particulate filter based on the at least a first input may comprise determining that it has been a predetermined duration since a last occurrence of regeneration. Determining the need for regeneration of the particulate filter based on the at least a first input may comprise determining that there has been a predetermined amount of fuel consumption since a last occurrence of regeneration. The engine controller may be further configured to determine a completion of regeneration of the particulate filter based on at least a second input and, responsive to determining the completion of the regeneration, advance the spark timing of the at least one non-donor cylinder by the first amount of retardation and advance the spark timing of the at least one donor cylinder by the second amount of retardation.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Figure 1:
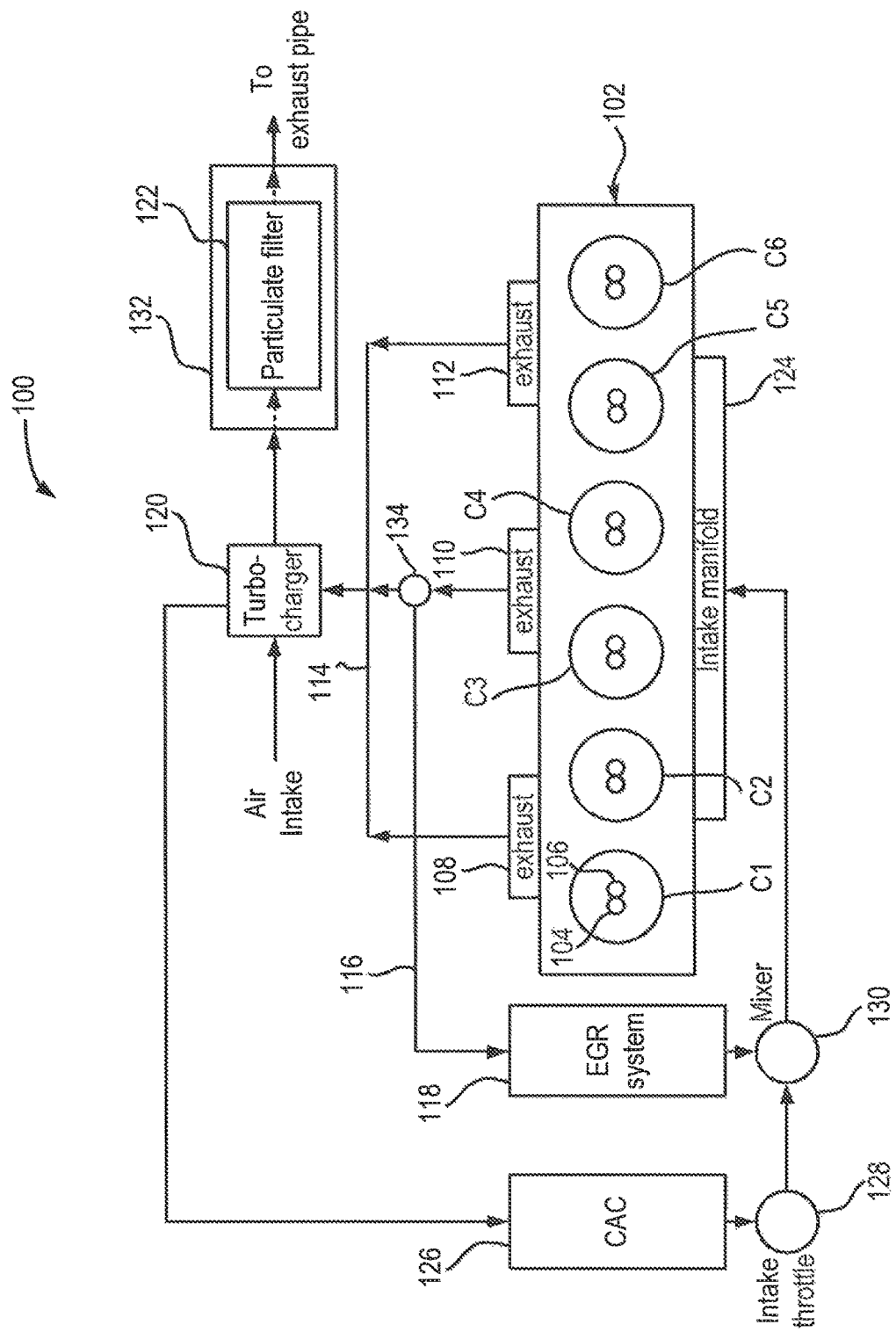
FIG. 1 illustrates a representation of an example spark-ignition engine system, according to an embodiment of the present disclosure.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive internal combustion assemblies and methods of operating internal combustion assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Internal combustion engine vehicles can comprise an exhaust aftertreatment system for processing exhaust gases generated by the internal combustion engine. The exhaust aftertreatment system can include a catalytic converter, which converts toxic gases and pollutants in the exhaust gas into less toxic pollutants by catalyzing a redox reaction. For example, a three-way catalyst combines oxygen with carbon monoxide and unburned hydrocarbons to produce carbon-dioxide and water, and reduces oxides of nitrogen. The exhaust aftertreatment system may also include a particulate filter or a soot filter to trap or filter particulate matter in the exhaust gas.

Over time, particulate matter can accumulate in the particulate filter to an extent that it increases a backpressure in the exhaust system. An increase in the backpressure can reduce the efficiency of the internal combustion engine. A regeneration process can be used to clean the particulate filter. Such a regeneration process includes increasing the exhaust gas temperature such that when the high temperature exhaust gas passes through the particulate filter, the particulate matter in the filter can be burned off. This reduces the accumulation of the particulate matter in the fitter, resulting in the reduction in backpressure and increase in the efficiency of the internal combustion engine.

One approach to increasing the exhaust gas temperature in gasoline fueled engines is to retard a spark timing of combustion in the engine. In gasoline fueled engines with multiple cylinders, the spark timing associated with each of the cylinders may be retarded by a certain amount. Some gasoline engines are configured to provide a portion of the exhaust gas from a subset or dedicated or donor cylinders to an exhaust gas recovery (EGR) system, while the remainder of the exhaust gas is discharged into the air through an exhaust aftertreatment system. Further, exhaust gas from the remainder of the cylinders, or non-donor cylinders, is discharged into the air also through the exhaust aftertreatment system.

Retarding the timing of gasoline engines including donor cylinders dedicated to providing exhaust gas to the EGR system may be not be beneficial. EGR systems process exhaust gas from the donor cylinders and provides the processed exhaust gas back to an intake manifold coupled to all the cylinders. Retarding the timings of the donor cylinders can raise the temperature of the exhaust gas that is provided to the EGR system. This can, in turn, raise the temperature of the processed exhaust gas provided to the intake manifold, thereby increasing the overall temperature of the intake gas. High temperature intake gases can have an adverse impact on the efficiency of operation and the reliability of the gasoline engine.

As discussed below, the gasoline engine can provide high temperature exhaust gas for particulate filter regeneration without increasing the risk of increase in the intake gas temperature. One example approach discussed below includes retarding the spark timing of those cylinders (e.g., non-donor cylinders) that provide exhaust gas to the exhaust system, while maintaining, or retarding to a relatively smaller degree, the spark timing of cylinders (e.g., donor cylinders) dedicated to providing exhaust gases to the EGR system. As the EGR valve setting is changed between 0 and 100%, the air-fuel ratio target for the donor cylinders may be changed to support the particulate filter regeneration event.

FIG. 1 illustrates a representation of an example spark-ignition engine system 100. The engine system 100 includes a spark-ignition engine 102 having six cylinders C1-C6. The engine 102 uses a spark to cause combustion of a fuel, which can include one or more of gasoline, compressed natural gas, hydrogen, and liquefied petroleum gas. Each of the six cylinders C1-C6 includes a fuel injector 104 and a spark plug 106. The fuel injector 104 injects fuel into the cylinders where it is mixed with an intake gas, while the spark plug 106 provides the spark to combust the fuel and intake gas mixture. Exhaust gases from the cylinders C1-C6 is delivered to three exhaust ports: a first exhaust port 108, which receives exhaust gas from cylinders C1 and C2; a second exhaust port 110, which receives exhaust gas from cylinders C3 and C4; and a third exhaust gas port 112, which receives exhaust gas from cylinders C5 and C6. The first exhaust port 108 and the third exhaust gas port 112 are coupled to the same exhaust system manifold 114, while the second exhaust port 110 is coupled to an EGR valve 134, which, in turn, is coupled to the EGR exhaust manifold 116 and the exhaust system manifold 114.

The EGR exhaust manifold 116 receives exhaust gas from cylinders C3 and C4, Cylinders C3 and C4 are referred to as "donor cylinders" and a proportion of the exhaust gas generated by cylinders C3 and C4 is directed towards an EGR system 118. For example, the EGR valve 134 can be configured to deliver a portion of the exhaust gases generated by the cylinders C3 and C4 to the EGR exhaust manifold 116, and the remainder of the exhaust gas to the exhaust system manifold 114. For example, the EGR valve can be configured such that a portion, ranging from about 0% to about 100%, of the exhaust gas generated by the donor cylinders C3 and C4 is provided to the EGR exhaust manifold 116. If the EGR valve 134 is set at 0%, then substantially all the exhaust gas from the donor cylinders C3 and C4 (or from the second exhaust port 110) is delivered to the exhaust system manifold 114, if the EGR valve is set at 100%, then substantially all the exhaust gas from the donor cylinders C3 and C4 (or from the second exhaust port 110) is delivered to the EGR exhaust manifold 116. Any setting between 0% and 100% provides a respective proportion of exhaust gas to the EGR exhaust manifold 116 and the remainder of the exhaust gas to the exhaust system manifold 114. The EGR valve 134 can be set by an engine controller to the desired proportional setting.

Cylinders C1, C2, C5, and C6 are referred to as "non-donor cylinders," and substantially all of the exhaust gas generate by these cylinders is directed towards a turbocharger 120 and an exhaust aftertreatment system 132 (which includes a particulate filter 122). It is understood that the number of donor cylinders and non-donor cylinders shown in the engine 102 of FIG. 1 is provided as an example, and that other implementations can have a different number of donor and non-donor cylinders.

The EGR system 118 is used to reduce nitrogen oxide emissions by recirculating a portion of the exhaust gas generated by the engine 102 back into the cylinders of the engine 102. The introduction of the exhaust gas into the cylinders reduces the proportion of oxygen in the intake gas provided to the engine 102 and absorbs combustion heat to reduce peak in-cylinder temperatures, thereby reducing the amount of nitrogen oxide generated. While exhaust gas is extracted from a subset of all cylinders in the engine 102, the EGR system can reintroduce the exhaust gas into all of the cylinders of the engine 102 via an intake manifold 124. The EGR system 118 can include a cooler or heat exchanger that reduces the temperature of the exhaust gas before it is reintroduced into the engine 102.

Exhaust gas in the exhaust system manifold 114 is provided to the turbocharger 120. In the turbocharger 120, the exhaust gas drives a turbine, which, in turn, drives a compressor. The compressor compresses air received from an air intake and provides the compressed air to a charge air cooler (CAC) 126, which cools the compressed air before it is provided to the intake throttle 128. The intake throttle 128 can adjust the volume of compressed air that is introduced into the engine 102, thereby controlling, in part, the power output of the engine 102. The compressed air provided by the intake throttle 128 is mixed with the exhaust gas output by the EGR system 118, and the mixture is fed into all of the cylinders of the engine 102 via the intake manifold 124. The engine 102 uses the fuel provided by the fuel injectors 104 and the spark provided by the spark plugs 106 to combust the received mixture of compressed air and the exhaust gas to generate power and exhaust gases.

The exhaust gas output of the turbine of the turbocharger 120 is fed to the exhaust aftertreatment system 132. The exhaust aftertreatment system 132 includes at least a particulate filter 122 used to filter soot or other particulate matter in the exhaust gas. Examples of particulate filters can include gasoline particulate filters, such as, without limitation, cordierite gasoline particulate filters and ceramic wall-flow gasoline particulate filters, and other filters that can block soot or particulate matter in a gas. The exhaust aftertreatment system 132 may also include a three-way catalytic converter positioned upstream or downstream of the particulate filter 122. Three-way catalytic converter combines oxygen with carbon monoxide to produce carbon-dioxide, combines oxygen with unburned hydrocarbons to produce water, and reduces oxides of nitrogen. The exhaust aftertreatment system 132 also can combine the particulate filter 122 and the three-way catalytic converter into a single package. The exhaust aftertreatment system 132, alternatively, can include a four-way catalytic converter, which not only reduces the harmful gases in the exhaust gas, but also filters particulate matter in a single component. In some embodiments, the particulate filter 122 can include at least one of a three-way catalytic converter and a four-way catalytic converter.

Over time, the particulate filter 122 can get clogged due to the accumulation of soot or particulate matter. Regeneration can involve increasing the temperature of the exhaust gas passing through the particulate filter 122, such that the increased temperature of the exhaust gas can burn off the soot or other particulate matter. The burned off soot and particulate matter is discharged into the air through the exhaust pipe. The regeneration of the particulate filter 122 is discussed below in relation to FIG. 2.

Figure 2:
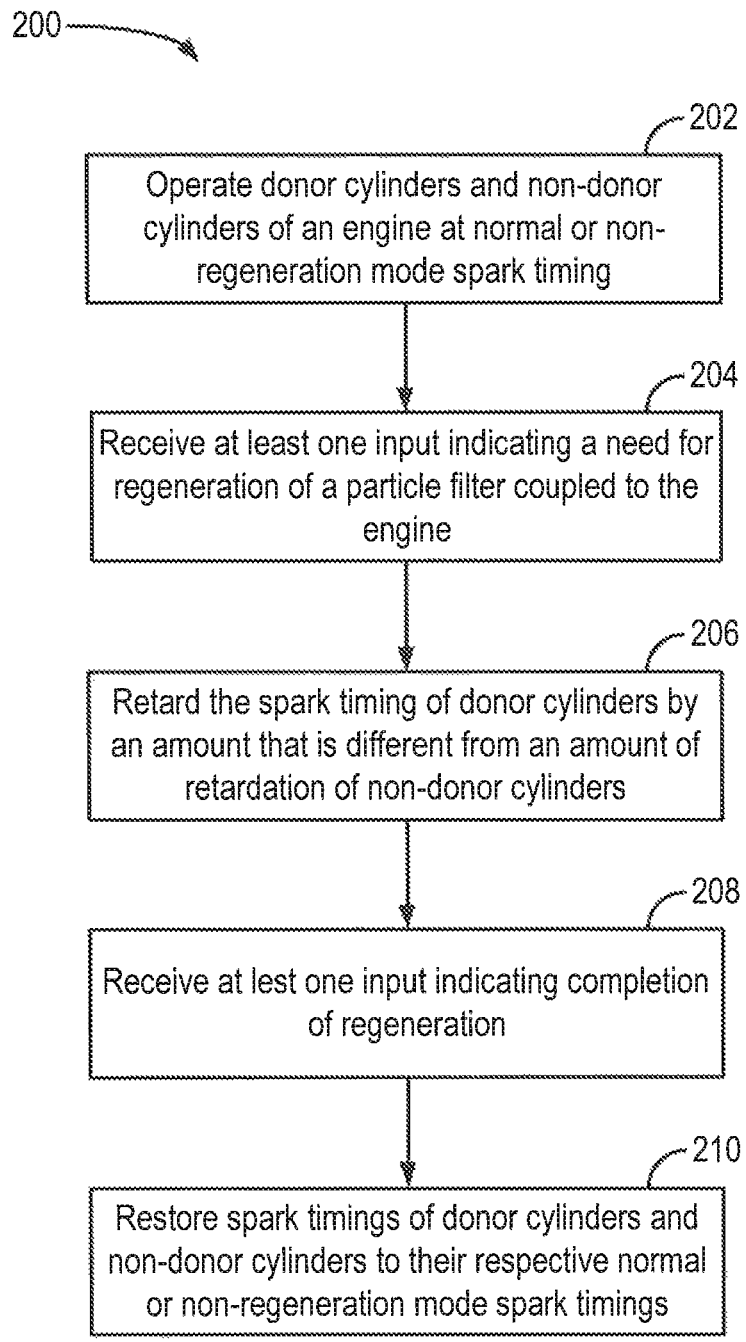
FIG. 2 shows a flow diagram of an example process for regeneration of a particulate filter coupled to a gasoline engine.

FIG. 2 shows a flow diagram of an example process 200 for regeneration of a particulate filter coupled to a gasoline engine. In particular, the process 200 describes controlling the ignition or spark timing of cylinders in a gasoline engine that includes donor cylinders, such as the engine 102 discussed above in relation to FIG. 1. The process 200 can be executed, for example, by an engine controller that controls the operation of the engine 102. The process 200 includes operating the donor cylinders and the non-donor cylinder of the engine at a normal or non-regeneration mode spark timing (stage 202). As discussed above, the engine 102 includes a set of donor cylinders C3 and C4, a portion of the exhaust gas output of which is directed towards the EGR system 118, and a set of non-donor cylinders C1, C2, C5, and C6, the exhaust gas output of which is directed towards the exhaust aftertreatment system 132. Under a normal or non-regeneration operating mode, the set of donor cylinders and the set of non-donor cylinders can be provided with a same spark timing. A spark timing can describe when a spark is to be generated in a cylinder based, in part, on a position of a piston in the cylinder. For example, the spark timing can be defined in terms of a crankshaft angle ("CA") (in degrees) before or after a top-dead-center (TDC) position of the piston. A spark timing of 10 CA degrees before TDC, for example, means the spark is ignited when the position of the crankshaft is 10 degrees, before in time, with respect to a position of the crankshaft when the piston is at TDC. Thus, under normal or non-regeneration mode, the engine controller can set the spark timing for each of the cylinders C1-C6 to x degrees. In some implementations, the engine controller, during normal or non-regeneration mode, may set a spark timing for the donor cylinders that is different from the spark timing of the non-donor cylinders.

The process 200 further includes receiving at least one input indicating a need for regeneration of a particulate filter (stage 204). The engine controller can receive inputs indicating the need for regeneration of the particulate filter in several ways. In one approach, the engine controller can receive pressure readings from pressure sensors positioned upstream or downstream the particulate filter 122. If the difference in the pressure drop (i.e., the pressure differential) across the particulate filter 122 is above a threshold amount, then the controller can determine that regeneration of the particulate filter is needed. The need for regeneration also can be determined based on factors such as duration since a last occurrence of a regeneration event, and fuel consumption since the last occurrence of the regeneration event.

The process 200 also includes responsive to an indication of the need for regeneration, retarding the spark timing of donor cylinders by an amount that is different from the amount of retardation of the spark timing of non-donor cylinders (stage 206). In response to the indication that regeneration is needed, the engine controller can retard the spark timing of the donor cylinders by $x_d$ degrees and the spark timing of the non-donor cylinders by $x_{nd}$ degrees, where $x_d \neq x_{nd}$. In some implementations, the engine controller can retard the spark timing of the non-donor cylinders by an amount that is greater than the amount by which the spark timing of the donor cylinders is retarded (i.e., $x_d < x_{nd}$). Also, the engine controller may retard the spark timing of the non-donor cylinders while not retarding the spark timing of the donor cylinders (i.e., $x_d = 0$). The engine controller can retard the spark timings of the donor cylinders and that of the non-donor cylinders from their respective spark timings during the normal or non-regeneration mode. For example, if the spark timing of both the donor cylinders and the non-donor cylinders were equal to x, then the engine controller retards the spark timing of the donor cylinders and the non-donor cylinders by $x_d$ and $x_{nd}$, respectively. In some implementations, the engine controller may retard the spark timing of the donor cylinders only if the EGR valve 134 is set to provide at least a portion of the exhaust gas to the exhaust system manifold 114. In some implementations, the engine controller can determine the amount of retardation of the donor cylinders based on the proportion of the exhaust gas directed to the EGR system 118 (or to the exhaust system manifold 114) by the EGR valve 134.

As mentioned above, retarding the spark timing of a cylinder results in an increase in the temperature of the exhaust gas generated by that cylinder. This increase in the temperature of the exhaust gas is beneficial in the regeneration of the particulate filter. In engine 102, because the donor cylinders provide a proportion of the generated exhaust gas to an EGR system, retarding the spark timing of the donor cylinders can undesirably increase the temperature of the intake stream. To reduce the risk of increase in temperature of the intake stream, the engine controller limits, or refrains from, the retardation of the spark timing of the donor cylinders.

The process 200 also includes receiving input indicating completion of the regeneration event (stage 208). The engine controller can receive an input indicating the completion of the regeneration process in several ways. For example, the engine controller can receive pressure levels from pressure sensors positioned upstream or downstream of the particulate filter. If the difference in the pressure is below a threshold value, the engine controller can determine that regeneration is no longer needed. The engine controller may also determine the completion of regeneration based the completion of a specified duration after the start of the regeneration.

The process 200 additionally includes restoring the spark timings of donor cylinders and non-donor cylinders to their respective normal or non-regeneration mode spark timings (stage 210). In response to determining that regeneration of the particulate filter is no longer needed, the engine controller can restore the spark timings of the cylinders. In particular, the engine controller can remove the retardation, if any, in the spark timing of the donor cylinders C3 and C4 as well as remove the retardation in the spark timing of the non-donor cylinders C1, C2, C5, and C6. By removing the retardation. The engine controller can restore the spark timing of the donor and the non-donor cylinders to their respective spark timing prior to regeneration.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method for regeneration of a particulate filter downstream an internal combustion engine having plurality of cylinders, comprising:
    operating at least one donor cylinder and at least one non-donor cylinder of the internal combustion engine at a spark timing, the particulate filter receiving exhaust gas from the at least one non-donor cylinder and the at least one donor cylinder, wherein a proportion of exhaust gas generated by the at least one donor cylinder is provided to an exhaust gas recirculation system;
    determining a need for regeneration of the particulate filter based on at least a first input; and
    responsive to determining the need for regeneration, retarding the spark timing of the at least one non-donor cylinder by a first amount of retardation and retarding the spark timing of the at least one donor cylinder by a second amount of retardation, the first amount being unequal to the second amount.

2. The method of claim 1, wherein retarding the spark timing of the at least one non-donor cylinder by a first amount of retardation and retarding the spark timing of the at least one donor cylinder by a second amount of retardation comprises setting the first amount of retardation to be greater than the second amount of retardation.

3. The method of claim 1, wherein retarding the spark timing of the at least one non-donor cylinder by a first amount of retardation and retarding the spark timing of the at least one donor cylinder by a second amount of retardation comprises setting the second amount of retardation to zero.

4. The method of claim 1, further comprising:
    determining a completion of regeneration of the particulate filter based on at least a second input; and responsive to determining the completion of the regeneration, advancing the spark timing of the at least one non-donor cylinder by the first amount of retardation and advancing the spark timing of the at least one donor cylinder by the second amount of retardation.

5. The method of claim 1, wherein operating the at least one donor cylinder and the at least one non-donor cylinder of the internal combustion engine at the spark timing comprises providing substantially all of the exhaust gas form the at least one donor cylinder to the exhaust gas recirculation system.

6. The method of claim 1, wherein determining the need for regeneration of the particulate filter based on the at least a first input comprises determining whether a pressure differential across the particulate filter is greater than a threshold pressure value.

7. The method of claim 1, wherein determining the need for regeneration of the particulate filter based on the at least a first input comprises determining that it has been a predetermined duration since a last occurrence of regeneration.

8. The method of claim 1, wherein determining the need for regeneration of the particulate filter based on the at least a first input comprises determining that there has been a predetermined amount of fuel consumption since a last occurrence of regeneration.

9. The method of claim 1, further comprising, further responsive to determining the need for regeneration, adjusting an exhaust gas recirculation valve positioned downstream of the at least one donor cylinder, the adjusting of the exhaust gas recirculation valve changing the proportion of the exhaust gas generated by the at least one donor cylinder that is provided to the exhaust gas recirculation system.

10. A method for regeneration of a particulate filter downstream an internal combustion engine having plurality of cylinders, comprising:
    operating at least one donor cylinder and at least one non-donor cylinder of the internal combustion engine at a spark timing, the particulate filter receiving exhaust gas from only the non-donor cylinders;
    determining a need for regeneration of the particulate filter based on at least a first input; and
    responsive to determining the need for regeneration, retarding the spark timing of the at least one non-donor cylinder by a first amount of retardation and retarding the spark timing of the at least one donor cylinder by a second amount of retardation, the first amount being unequal to the second amount.

11. The method of claim 10, wherein retarding the spark timing of the at least one non-donor cylinder by a first amount of retardation and retarding the spark timing of the at least one donor cylinder by a second amount of retardation comprises setting the first amount of retardation to be greater than the second amount of retardation.

12. The method of claim 10, wherein retarding the spark timing of the at least one non-donor cylinder by a first amount of retardation and retarding the spark timing of the at least one donor cylinder by a second amount of retardation comprises setting the second amount of retardation to zero.

13. The method of claim 10, wherein determining the need for regeneration of the particulate filter based on the at least a first input comprises determining whether a pressure differential across the particulate filter is greater than a threshold pressure value.

14. An engine system, comprising:
an internal combustion engine comprising at least one donor cylinder and at least one non-donor cylinder;
an exhaust gas recirculation system, the exhaust gas recirculation system in exhaust gas receiving communication with the at least one donor cylinder and in exhaust gas providing communication with an intake manifold of the internal combustion engine;
an exhaust aftertreatment system in exhaust gas receiving communication with the internal combustion engine, the exhaust aftertreatment system comprising a particulate filter; and
an engine controller configured to:
operate the at least one donor cylinder and the at least one non-donor cylinder of the internal combustion engine at a spark timing;
determine a need for regeneration of the particulate filter based on at least a first input; and
responsive to determining the need for regeneration, retard the spark timing of the at least one non donor cylinder by a first amount of retardation and retarding the spark timing of the at least one donor cylinder by a second amount of retardation, the first amount being unequal to the second amount.

15. The engine system of claim 14, wherein the exhaust aftertreatment system is in exhaust gas receiving communication with only the at least one non-donor cylinder.

16. The engine system of claim 14, wherein a proportion of exhaust gas generated by the at least one donor cylinder is provided to the exhaust gas recirculation system, and further comprising an exhaust gas recirculation valve positioned and configured so as to selectively change the proportion of the exhaust gas generated by the at least one donor cylinder that is provided to the exhaust gas recirculation system.

17. The engine system of claim 16, wherein the engine controller is further configured to:
further responsive to determining the need for regeneration, adjust the exhaust gas recirculation valve, thereby changing the proportion of the exhaust gas generated by the at least one donor cylinder that is provided to the exhaust gas recirculation system.

18. The engine system of claim 14, wherein retarding the spark timing of the at least one non-donor cylinder by a first amount of retardation and retarding the spark timing of the at least one donor cylinder by a second amount of retardation comprises setting the first amount of retardation to be greater than the second amount of retardation.

19. The engine system of claim 14, wherein retarding the spark timing of the at least one non-donor cylinder by a first amount of retardation and retarding the spark timing of the at least one donor cylinder by a second amount of retardation comprises setting the second amount of retardation to zero.

20. The engine system of claim 14, wherein determining the need for regeneration of the particulate filter based on the at least a first input comprises determining whether a pressure differential across the particulate filter is greater than a threshold pressure value.

21. The engine system of claim 14, wherein determining the need for regeneration of the particulate filter based on the at least a first input comprises determining that it has been a predetermined duration since a last occurrence of regeneration.

22. The engine system of claim 14, wherein determining the need for regeneration of the particulate filter based on the at least a first input comprises determining that there has been a predetermined amount of fuel consumption since a last occurrence of regeneration.

23. The engine system of claim 14, wherein the engine controller is further configured to:
determine a completion of regeneration of the particulate filter based on at least a second input; and
responsive to determining the completion of the regeneration, advance the spark timing of the at least one non-donor cylinder by the first amount of retardation and advance the spark timing of the at least one donor cylinder by the second amount of retardation.

* * * * *